Oct. 8, 1940.                W. H. BENNETT                2,216,729
                        ELECTRIC DISCHARGE SYSTEM
                          Filed Feb. 4, 1939

INVENTOR.
WILLARD H. BENNETT
BY John B. Brady
ATTORNEY

Patented Oct. 8, 1940

2,216,729

UNITED STATES PATENT OFFICE 2,216,729

ELECTRIC DISCHARGE SYSTEM

Willard H. Bennett, Newark, Ohio, assignor to Electronic Research Corporation, Newark, Ohio, a corporation of Ohio Application February 4, 1939, Serial No. 254,726

15 Claims. (Cl. 175—363)

My invention relates broadly to electric discharge systems and more particularly to an arrangement for rectification of current employing a novel assembly of electric discharge electrodes.

This application is a continuation in part of my copending application Serial No. 224,217, filed August 10, 1938, for Rectification system.

One of the objects of my invention is to provide an electric discharge system for rectification of electrical current employing an assembly of electrodes operating at substantially atmospheric pressures having means for the self bias of the operating electrodes under control of the alternating current to be rectified.

Another object of my invention is to provide a self biasing circuit for rectification systems in which the required bias for the control electrode of an electrode assembly is secured from the impressed alternating current to be rectified for suppression of emission from emitters to a collector during successive half cycles when the emitters swing positive with respect to the collector.

Still another object of my invention is to provide an arrangement of emitters and control electrodes in coaction with a target wherein the control electrodes are alternately disposed between the emitters.

A further object of my invention is to provide a system of rectification applicable both to half wave rectifiers and full wave rectifiers and employing electrode assemblies operating substantially at atmospheric pressures and wherein a potential derived from the applied alternating current to be rectified is utilized to self bias the control electrode or electrodes for effecting suppression of emission on successive half cycles of the applied alternating current for thereby giving rectification.

Figure 1:
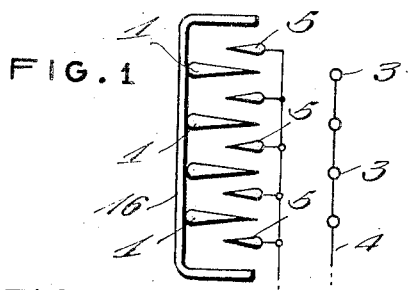
Figure 2:
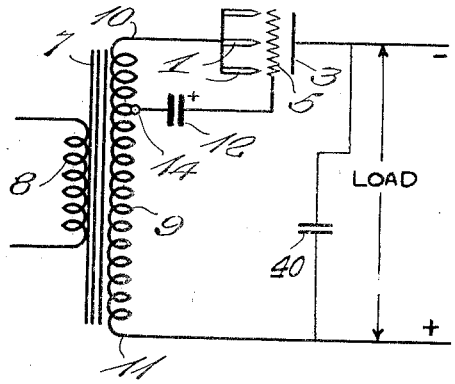
Figure 3:
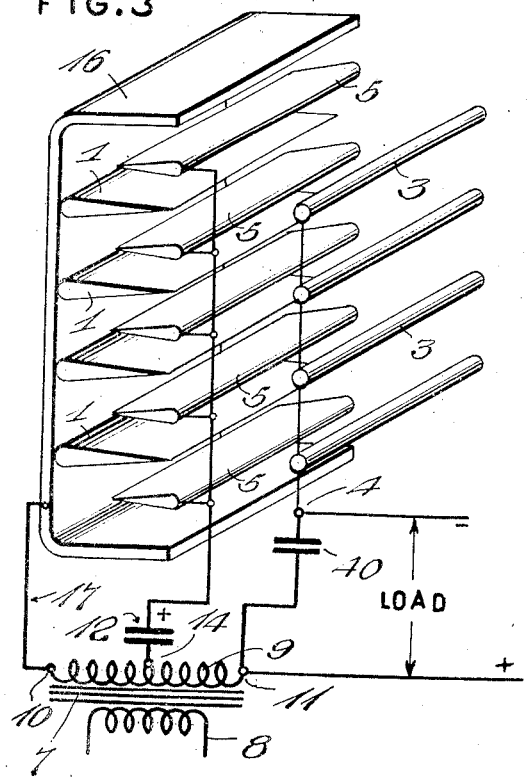
Figure 4:
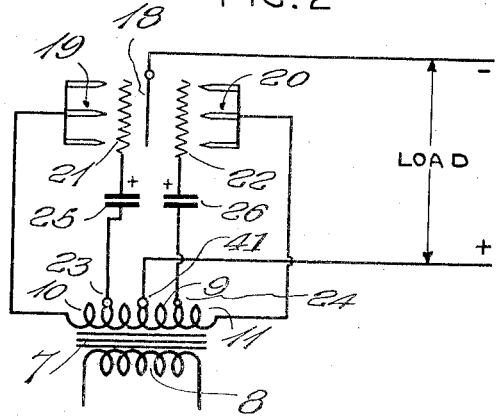
Figure 5:
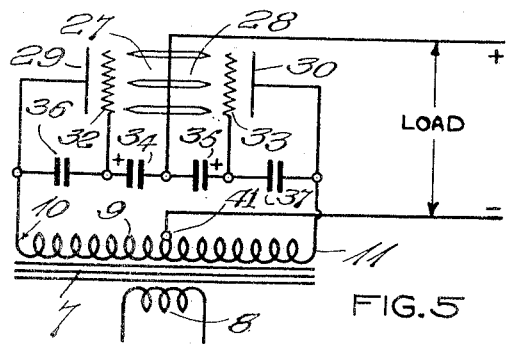
Figure 6:
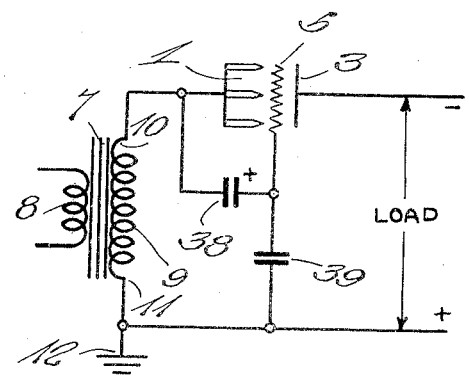

Other and further objects of my invention reside in an arrangement of electric discharge system for both half and full wave rectification of alternating current as set forth more fully in the specification hereinafter following by reference to the accompanying drawing, in which:

Figure 1 schematically shows the electrode assembly of the electric discharge system of my invention; Fig. 2 is a schematic circuit arrangement of the electrode assembly illustrated in Fig. 1; Fig. 3 shows a schematic arrangement of electrode assembly embodying the principles of my invention; Fig. 4 illustrates the self biasing arrangement of my invention applied to a full wave rectification system; Fig. 5 shows a modified circuit arrangement for a full wave rectification system utilizing the electric discharge system of my invention; and Fig. 6 shows a further modified form of half wave rectifier embodying the principles of my invention.

Referring to Fig. 1 of the drawing, the electrode assembly includes a bank of emitters located at 1, which are the primary emitters which are electrically connected together through the member 16. The primary emitters 1 are streamlined in contour and are directed toward the target rod-like electrodes 3, electrically connected through bus 4. Alternately positioned with respect to the emitters 1, I provide a bank of emitters 5. The bank of emitters 5 are streamlined in contour but have their emitting edges directed away from the target members 3 and in the direction of the emitters 1 toward the member 16. The emitters 5 are electrically connected together through lead 6 as shown. The emitters 5 serve as control electrodes with respect to primary emitters 1 as will be more fully understood by consideration of the schematic circuit diagram illustrated in Fig. 2.

The arrangement of the electrode assembly in a rectifier circuit has been shown in Fig. 2. The rectifier circuit includes an input transformer 7 having primary winding 8 and secondary winding 9. The alternating current to be rectified is impressed upon primary winding 8 and delivered to secondary winding 9. The end 10 of the secondary winding 9 connects to the bank of primary emitters 1 through member 16 shown in Fig. 3. The member 16 is formed from conductive material and is substantially U-shaped in section with the sides thereof substantially embracing or extending around the bank of primary emitters 1. The opposite end of secondary winding 9, shown at 11, connects to one side of the load. The target constituted by target members 3 connects to the opposite side of the load. The control electrode constituted by emitters 5 connects through a condenser 12 to a tap 14 on the secondary winding 9.

Referring to Fig. 3 the tendency of the emitters or control electrodes 5 is to swing to a voltage like that of the targets 3 with respect to the emitters 1 which causes the emitters or control electrodes 5 to fire toward the emitters 1 and member 16. As a consequence of this tendency, when adequate voltage is being applied from the secondary of the transformer 9 the emitters or control electrodes 5 will swing to the intermediate bias voltage characteristic of the discharge, namely, a positive potential with respect to the emitters 1. The emitters 1 are all connected at the back thereof by the backing member 16, as shown. The emitters or control electrodes 5 are all connected to a common bus and to an electrical connection into a rectifier as shown in Figs. 4, 5 and 6. The emitters or control electrodes 5 constituting the control electrode emit electric discharges toward the emitter electrodes 1 and the member 16 in the area thereof intermediate the emitter electrodes 1 on those half cycles of the alternating current when electrodes 1 are positive with respect to control members 5 until the condenser 12 becomes sufficiently charged. On the other half cycles, the rear edges of the control members 5, that is the rounded edges thereof as distinguished from the emitting edges to which the stream-lined members taper, are more positive than the emitter electrodes 1 by the amount of the D. C. charge on the condenser 12. The position of emitters 1 is so selected with respect to members 3 constituting the target electrode that the emitters 1 emit negative charges toward the members 3 constituting the target. When the emitter constituted by electrodes 1 swings positive with respect to target 3, the direct current positive potential of control electrodes 5 suppresses the emission, thus giving rectification. Current flows to the load only on those half cycles when the emitters 1 are negative with respect to target 3. The suppression action occurs during those half cycles when control electrodes 5 are more positive than the emitter electrodes 1. A suitable filter such as represented by condenser 40 may be provided between the rectifier and the load circuit.

In Fig. 4 I have shown the self biasing method heretofore explained applied to a full wave rectifier circuit in which a common target electrode 18 receives discharges from sets of discharge electrodes 19 and 20 directed toward opposite sides of target electrode 18. Control electrodes 21 and 22 are disposed between the common target electrode 18 and the associated emitters. This is to say, control electrode 21 is interposed between target electrode 18 and set of emitters 19, while control electrode 22 is interposed between target electrode 18 and set of emitters 20. The input transformer 7, including the primary winding 8 and secondary winding 9 is connected as shown, that is, with opposite ends 10 and 11 connected respectively with groups of emitters 19 and 20. Mid-tap 41 connects to one side of the load and target electrode 18 connects to the other side of the load. Intermediate taps 23 and 24 are provided on the secondary winding 9. Intermediate tap 23 connects through condenser 25 to control electrode 21. Intermediate tap 24 connects through condenser 26 with control electrode 22.

On the alternate cycles, self bias is produced by the coaction of the respective control electrodes with their associated emitters while rectification takes place when the emitter swings positive with respect to the collector so that the D. C. positive potential of the control electrode suppresses the emission, thus giving rectification.

I may employ the self bias arrangement in a circuit as illustrated in Fig. 5 wherein two sets of discharge electrodes emit toward two opposite targets. In this arrangement two sets of emitters, shown at 27 and 28 emit toward opposite targets 29 and 30. Target 29 is connected to the end 10 of secondary winding 9 of transformer 7 while target 30 is connected to the end 11 of secondary winding 9. The alternating current to be rectified is supplied to the transformer through winding 8. The connection to the load is taken from mid-tap 41 on secondary winding 9 and from sets of emitters 27 and 28 as shown. The self biasing circuits are completed from control electrodes 32 and 33 through condensers 36 and 37 to the terminals 10 and 11 as shown. Smoothing condensers 34 and 35 are connected between the control electrodes and their associated target electrodes, the emitters 27 and 28.

A similar arrangement may be provided in a single wave rectifier as illustrated in Fig. 6 wherein self bias is obtained through a condenser path 39 in circuit with sets of discharge electrodes 1 and control electrode 5 arranged as shown in relation to target 3. Alternating current to be rectified is supplied to primary winding 8 of transformer 7 and impressed through secondary winding 9 from terminal 10 to the discharge electrodes 1 and from terminal 11 to the load. Terminal 11 is grounded at 12. Smoothing condenser 38 is connected between the control electrode 5 and the electrode 1, as shown. In this arrangement as in the several circuits heretofore explained, the emitter swings positive with respect to the collector while the D. C. positive potential of the control electrode suppresses the emission, thus giving rectification. The control electrode is spacially related to the emitting electrodes at such a distance that for all normal values of potential with which the system is intended to function there will be no arcing. A safe spacial relation is employed to insure discharge without arcing in the atmospheric pressures at which the apparatus of my invention is designed to function. It is unnecessary to enclose the electrode assembly in an envelope of any kind. However, if the electrode assembly is enclosed in an envelope, the pressures therein may be substantially atmospheric.

The self biasing arrangements for rectifiers as set forth herein have been found to be highly successful in operation and while I have described preferred embodiments of my invention, I realize that my invention may be embodied in other modified forms and I do not intend by the disclosures herein presented to limit my invention to any particular form of circuit, but intend that all circuits embodying my invention shall be included within the scope of the appended claims.

What I claim as new and desire to secure by Letters Patent of the United States is as follows:

1. In an electric discharge system, a multiplicity of emitting electrodes, a corresponding multiplicity of control electrodes interleaved with the emitting electrodes, target electrodes coacting with said emitting electrodes, said electrodes being maintained operative at substantially atmospheric pressure, and a circuit arrangement including all of said electrodes comprising means for impressing alternating current between said emitting electrodes and said coacting target electrodes, and means connected between the aforesaid means and said control electrodes for impressing a bias potential on said control electrodes positive with respect to said emitting electrodes for suppressing emission from said emitting electrodes with respect to said target electrodes during the successive half cycles of the applied alternating current when said emitting electrodes are positive.

2. In an electric discharge system, a multiplicity of emitting electrodes, a corresponding multiplicity of control electrodes interleaved with the emitting electrodes, target electrodes coacting with said emitting electrodes, and a circuit arrangement including all of said electrodes comprising means for impressing alternating current between said emitting electrodes and said coacting target electrodes, and a circuit including a condenser arranged to supply a portion of the applied alternating current in a path between said emitting electrodes and said control electrodes for biasing said control electrodes and effecting suppression of emission during successive half cycles of the applied alternating current, said control electrodes having electric discharge portions directed toward said emitting electrodes, and said condenser being charged by the discharge current in said control electrodes.

3. In an electric discharge system, an electrode assembly comprising a multiplicity of target electrodes, a corresponding multiplicity of emitting electrodes directed toward said target electrodes, a multiplicity of control electrodes interleaved in spacial relation between said emitting electrodes, a transformer having primary and secondary windings, means for supplying alternating current to said primary winding, said secondary winding having one end connected with said emitting electrodes and the opposite end connected with a load, a connection from said target electrodes to the other side of said load, and a connection from said control electrode through a condenser to a tap in said secondary winding, whereby the alternating current impressed between said emitting electrodes and said control electrode is rectified for biasing said control electrode for effecting suppression of emission toward said target electrode during successive half cycles, whereby rectified current is supplied from said target electrode to the load.

4. In an electric discharge system, a multiplicity of emitting electrodes, a multiplicity of control electrodes interposed between said emitting electrodes, a multiplicity of target electrodes substantially aligned with the emitting electrodes, a source of alternating current, means for biasing said control electrodes by a potential derived from a portion of the alternating current applied across said emitting electrodes and said control electrodes, a load, and means for applying substantially all of said alternating current across said emitting electrodes and said target electrodes through said load whereby emission is suppressed from said emitting electrodes toward said target electrodes on successive half cycles of the applied alternating current for supplying rectified current to the load.

5. In an electric discharge system, an electrode assembly comprising a discharge electrode, a control electrode and a target electrode, an input system comprising a transformer having primary and secondary windings with said secondary winding connected at one end to said discharge electrode and at the other end to one side of a load, a connection from said target to the other side of the load, and a condenser connected between said secondary winding and said control electrode, said control electrode having a discharge portion directed toward said discharge electrode for producing a discharge current for charging said condenser.

6. In an electric discharge system, an electrode assembly comprising a discharge electrode, a control electrode and a target electrode, an input system comprising a transformer having primary and secondary windings with said secondary winding connected at one end to said discharge electrode and at the other end to one side of a load, a connection from said target to the other side of the load, a condenser disposed in a path extending between said discharge electrode and said control electrode, and a separate condenser connected between said control electrode and the first mentioned side of the load.

7. In an electric discharge system, a full wave rectifier circuit comprising an input system and an output system, said input system including a transformer having a secondary winding, sets of discharge electrodes directed toward each other, one set of said electrodes being connected to one end of said secondary winding and the other set of said discharge electrodes being connected to the opposite end of said secondary winding, a target electrode intermediate said discharge electrodes, individual control electrodes disposed adjacent opposite sides of said target electrode and said sets of discharge electrodes, all said electrodes being maintained operative at substantially atmospheric pressure, and a circuit individual to each of said control electrodes and portions of said secondary winding for producing a bias voltage between each set of discharge electrodes and the associated control electrode for controlling the operation of said electric discharge system.

8. In an electric discharge system, a full wave rectifier circuit comprising an input system and an output system, said input system including a transformer having a secondary winding, sets of discharge electrodes directed toward each other, one set of said electrodes being connected to one end of said secondary winding and the other set of said discharge electrodes being connected to the opposite end of the said secondary winding, a target electrode intermediate said discharge electrodes, individual control electrodes disposed between opposite sides of said target electrode and said sets of discharge electrodes, and a circuit including a condenser individual to each of said control electrodes and to separate portions of said secondary winding for impressing alternating current potential between each set of discharge electrodes and the associated control electrode for producing a bias potential for controlling the operation of said rectification system, said control electrodes having discharge portions directed toward the respective sets of discharge electrodes for producing discharge currents for charging the respective condensers connected with said control electrodes.

9. An electric discharge system comprising a full wave rectifier including an input circuit and an output circuit, said input circuit including a transformer having a secondary winding, an electrode assembly comprising sets of discharge electrodes extending in opposite directions, a target electrode coacting with each of said sets of discharge electrodes, a connection between one of said target electrodes and one end of said secondary winding, a connection between the other of said target electrodes and the opposite end of said secondary winding, a control electrode disposed adjacent each of said sets of discharge electrodes and the associated target electrode, all said electrodes being maintained operative at substantially atmospheric pressure, a load circuit extending between said sets of discharge electrodes and a connection to a mid-point in said secondary winding, and separate paths between each of said control electrodes and said secondary winding including means for producing a bias voltage between the respective sets of discharge electrodes and the associated control electrodes.

10. An electric discharge system comprising a full wave rectifier including an input circuit and an output circuit, said input circuit including a transformer having a secondary winding, an electrode assembly comprising sets of discharge electrodes extending in opposite directions, a target electrode coacting with each of said sets of discharge electrodes, a connection between one of said target electrodes and one end of said secondary winding, a connection between the other of said target electrodes and the opposite end of said secondary winding, a control electrode interposed between each of said sets of discharge electrodes and the associated target electrode, a load circuit extending between said sets of discharge electrodes and a connection to a mid-point in said secondary winding, and separate paths each including a condenser connected between the respective control electrodes and said secondary winding for selectively biasing the control electrodes, said control electrodes having discharge portions directed toward the respective sets of discharge electrodes for producing discharge currents for charging the respective condensers connected with said control electrodes.

11. In a high power rectifier, a bank of emitters, a bank of control electrodes and a bank of target electrodes maintained at substantially atmospheric pressure, said emitters being intermeshed with said control electrodes, a source of alternating current, a connection between one end of said source and said bank of emitters, a capacitive connection between said bank of control electrodes and said source of alternating current, and an output circuit connected with said bank of target electrodes and one side of said alternating current source.

12. A high power rectifier maintained at substantially atmospheric pressure and comprising in combination a bank of emitters, a bank of control electrodes intermeshed with said bank of emitters, a bank of target electrodes, an alternating current source, means for exciting said bank of emitters and said bank of control electrodes according to the cyclic changes of the alternating current source, and an output circuit connected with said bank of target electrodes and one side of said alternating current source for deriving rectified current by the coaction of said bank of emitters and said bank of control electrodes with respect to said bank of target electrodes.

13. In a high power rectifier system, an alternating current source, a bank of emitting electrodes, a bank of control electrodes and an associated bank of target electrodes maintained at substantially atmospheric pressure, said emitting electrodes and said control electrodes each having intermeshed discharge points adjacent to each other, means for cyclicly exciting said bank of emitting electrodes and said bank of control electrodes from said source of alternating current, and an output circuit connected at one end with said bank of target electrodes and at the other end with said source of alternating current.

14. A high power rectifier system maintained at substantially atmospheric pressure and comprising in combination with a source of alternating current, a bank of emitting electrodes, a bank of control electrodes cooperative with the bank of emitting electrodes, a bank of target electrodes associated with the aforesaid banks of electrodes, connections between said bank of emitting electrodes and said bank of control electrodes and said source of alternating current for cyclicly changing the polarity of said bank of emitting electrodes and said bank of control electrodes according to the cyclic changes in the alternating current supplied thereto for effecting electric discharge with respect to said bank of target electrodes uni-directionally, and a circuit between said target electrodes and said source of alternating current for supplying rectified current to a load.

15. In an electric discharge rectification system, target electrodes, electric discharge electrodes directed towards said target electrodes and cooperative therewith, control electrodes constituted as emitters disposed substantially intermediate said discharge electrodes and directed towards said discharge electrodes and cooperative therewith, said discharge electrodes having means electrically connected therewith acting as target means for the emission from said control electrodes, a load circuit including a source of alternating current and said cooperative discharge and target electrodes, and means including a condenser connected between said discharge electrodes and said control electrodes and operative to maintain a positive bias potential on said control electrodes for suppressing discharge from said discharge electrodes during alternate half cycles of the alternating current from said source, said condenser being charged by a current accompanying an emission from said control electrodes to said discharge electrodes during said alternate half cycles.

WILLARD H. BENNETT.